(12) United States Patent
Takeda et al.

(10) Patent No.: US 6,248,152 B1
(45) Date of Patent: Jun. 19, 2001

(54) METHOD OF REDUCING IRON OXIDE ON A MOVABLE HEARTH FURNACE

(75) Inventors: Kanji Takeda; Yoshitaka Sawa, both of Chiba (JP)

(73) Assignee: Kawasaki Steel Corporation (JP)

( * ) Notice: Subject to any disclaimer, the term of this patent is extended or adjusted under 35 U.S.C. 154(b) by 0 days.

(21) Appl. No.: 09/319,002

(22) PCT Filed: Mar. 27, 1998

(86) PCT No.: PCT/JP98/01401

§ 371 Date: May 27, 1999

§ 102(e) Date: May 27, 1999

(87) PCT Pub. No.: WO99/16915

PCT Pub. Date: Apr. 8, 1999

(30) Foreign Application Priority Data

Sep. 30, 1997 (JP) .................................................. 9-265408

(51) Int. Cl.$^7$ ...................................................... C21B 13/08
(52) U.S. Cl. ................................................. 75/484; 75/503
(58) Field of Search .............................. 75/484, 478, 503

(56) References Cited

U.S. PATENT DOCUMENTS 3,647,417 * 3/1972 Wetzel et al. ........................... 75/478
5,637,133 * 6/1997 Munnix et l.a ......................... 75/484

* cited by examiner

Primary Examiner—Melvyn Andrews
(74) Attorney, Agent, or Firm—Austin R. Miller

(57) ABSTRACT

With a solid fine reducing material containing hydrogen placed as a lower layer on a movable hearth, a powdered mixture of an oxide powder dominantly of a fine iron ore and a solid fine reducing material is stacked in layered arrangement, and subsequent reduction operation is performed.

5 Claims, 5 Drawing Sheets

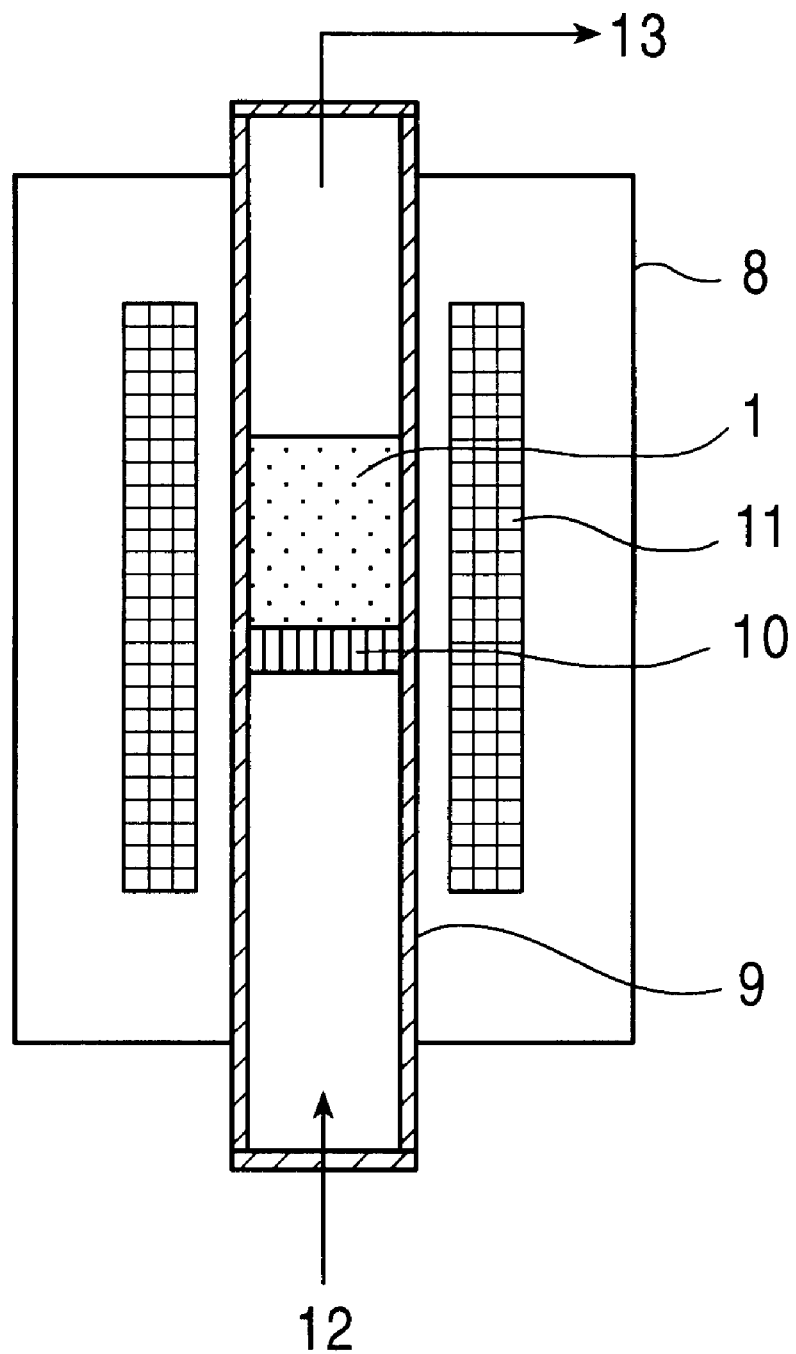

METHOD OF REDUCING IRON OXIDE ON A MOVABLE HEARTH FURNACE

TECHNICAL FIELD

The present invention relates to a technique of producing reduced iron from iron ore with use of a movable hearth furnace.

BACKGROUND ART

The production of crude steel is carried out in a blast furnace-converter process or an electric furnace process. Of such methods, the electric furnace process produces steel by melting scrap or reduced iron used as a feed stock through the action of electric energy and, where needed, by further refining the melt. Scrap is now preferred as the feed stock, but reduced iron has of late been in growing demand to compensate for shortages of the scrap, and also to meet the trend toward high quality obtainable by the electric furnace method.

A certain process for the production of reduced iron is known as disclosed in Japanese Unexamined Patent Publication No. 63-108188. This process stacks an iron ore and a solid reducing material in layered formation on a horizontally rotary hearth, followed by reduction of the iron ore with heat applied from above by means of radiant heat transfer, whereby a reduced iron is provided. Such known process is advantageous in respect of possible construction of equipment at rather a low cost, less frequent trouble during operation and the like. In many instances, a horizontally movable hearth takes the form of a rotary hearth as seen in FIG. 1A and FIG. 1B of the accompanying drawings, the two figures being taken to explain the structural details of such rotary hearth. On a movable (rotary) hearth 3 is stacked a layer 1 which is a powdered mixture of an iron ore (oxide powder mainly of a particulate iron ore) and a solid reducing material. The movable hearth 3 is covered by a furnace body 4 lined with a refractory material, and a burner 5 is located upstream in the furnace body. By use of the burner as a source of heat, the iron ore on the movable hearth is subjected to reduction. In FIG. 1A, reference numeral 6 refers to a charging unit for the feed stocks, and 7 to a discharge unit.

In the operation of the foregoing type of furnace, the internal furnace temperature is usually set at around 1300° C. Furthermore, after the reduction is completed, the finished reduced iron is generally cooled on the roraty hearth with the use of a cooling unit and thereafter taken out of the furnace. This prevents such reduced iron from becoming oxidized outside the furnace and also renders the same easy to handle.

The reduction taking place in such method of the production of reduced iron proceeds as a direct reduction between an iron ore and a solid reducing material. The direct reduction is an endothermic reaction, and the supply of heat and the rate of reduction are the determinants of ultimate productivity. The heat supply is conducted to the layer composed of an iron ore and a solid reducing material, by means of radiant heat transfer derived from a burner flame or from an inner wall of the furnace by the use of a burner as a source of heat. With the heat thus supplied, the reduction rate is decided by the thermal conductivity within the layer of iron ore and solid reducing material, and further by the difference in temperature between the reaction temperature and the furnace temperature.

By the term "auxiliary feed stock" used herein is meant a fluxing agent such as limestone, fluorite, serpentine and dolomite.

DISCLOSURE OF THE INVENTION

In order to cope with an increasing demand for a reduced iron, the present invention contemplates achieving shortened reduction time and hence improved productivity. More specifically, the invention provides as its principal object a method of operating a movable hearth furnace which can lower the temperature at which to initiate the reaction, thereby attaining an increased rate of heat transfer and a shortened time for reduction, by stacking a layer containing a fine iron ore and a solid fine reducing material on a horizontally movable hearth, and subsequently reducing the fine iron ore by radiant heat transfer from an upper portion within the furnace.

BRIEF DESCRIPTION OF THE DRAWINGS

FIG. 2 is a view explanatory of an apparatus used for experimentation.

Figure 1A:
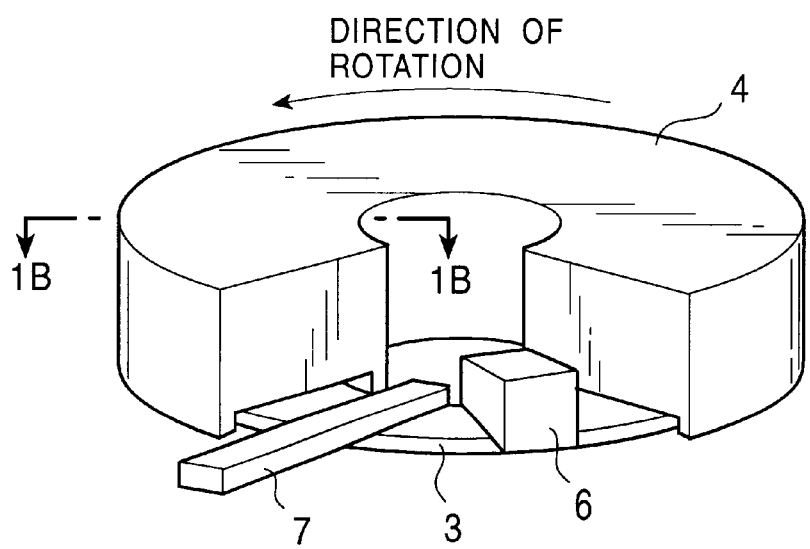
FIGS. 1A and 1B are views explanatory of a rotary hearth furnace, FIG. 1A showing the whole furnace, and FIG. 1B showing the furnace in cross section as taken along a line 1B—1B.

EXPLANATION OF REFERENCE NUMERALS 1 layer of powdered mixture of iron ore (oxide) and reducing material
2 solid fine reducing material containing hydrogen
3 movable (rotary) hearth
4 furnace body
5 burner
6 layup unit of feed stocks
7 discharge unit
8 annular furnace
9 furnace core tube for gas seal
10 grating for hydrogen introduction
11 heating medium
12 introduction of hydrogen
13 discharging of gas

MODE OF CARRYING OUT THE INVENTION

When a powdered mixture of an oxide powder composed dominantly of a fine iron ore with a solid fine reducing material is heated from outside, a reduction reaction proceeds with those reactions continuously initiated as represented by the formulae (1) and (2) below:

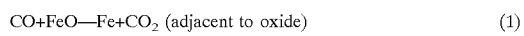  (1)

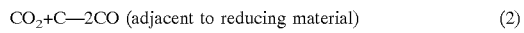  (2)

The reduction reaction of the formula (1) proceeds generally at a temperature of 600° C. or above, whereas the reaction of the formula (2) fails to takes place unless the temperature elevates to a higher level. Additionally, it is required that, for both of the reactions to continuously proceed, $CO_2$ formed in the formula (1) must be smoothly diffused in the solid fine reducing material, and CO formed in the formula (2) must be smoothly diffused in the oxide powder. In the case of use of an iron ore and a solid reducing material which are commonly employed, a temperature of about 1100° C. is a reaction-initiating temperature expected to show a rate of reaction suited for practical application.

In the movable hearth furnace according to the present invention, the heat supply is conducted, with respect to a layer composed of iron ore and a solid reducing material, by means of radiant heat transfer derived from a burner flame or from an inner wall of the furnace, with use of a burner as a source of heat. Along with the heat supplied in that way, the reduction rate is determinable by the thermal conductivity within the layer composed of iron ore and solid reducing material and further by the difference in temperature between the reaction temperature and the furnace temperature. Thus, the reduction reaction proceeds by taking advantage, as a driving force of heat transfer, of the difference in temperature between a reaction temperature of 1100° C. and a furnace temperature of 1300° C.

On the other hand, hydrogen influences in the rate of reaction. With particular attention paid to the fact that the reactions represented by the following formulae (3) and (4) are allowed to proceed at a higher rate than at that those of the formulae (1) and (2), experiments were conducted with use of an experimental apparatus shown in FIG. 2.

$$H_2 + FeO \rightarrow Fe + H_2O \text{ (adjacent to oxide)} \tag{3}$$

$$H_2O + C \rightarrow CO + H_2 \text{ (adjacent to reducing material)} \tag{4}$$

In FIG. 2, reference numeral 1 refers to a powdered mixture of an oxide powder dominantly of a fine iron ore and a solid fine reducing material, 8 to an annular furnace, 9 to a furnace core tube for gas seal, 10 to a grating for introducing hydrogen therethrough, 11 to a heating medium, 12 to introduction of hydrogen and 13 to discharging of gas. Into the annular furnace maintained at a given temperature was charged a powdered mixture of an oxide powder and a solid reducing material, and hydrogen was caused to flow in a small amount into the furnace from a lower portion of the latter. On the assumption that the solid reducing material is mixed in an amount of 600 kg based on 1000 kg of iron, the hydrogen was introduced into the furnace at its lower portion in an amount equivalent to that generated from the solid reducing material, namely the carbon material. Examination was made of reduction-initiating temperatures in the above manner. The experimental results are given in FIG. 3 as a graphical representation of the relationship between the content of $H_2$ in a carbon material and the temperature at which to initiate reduction.

Figure 3:
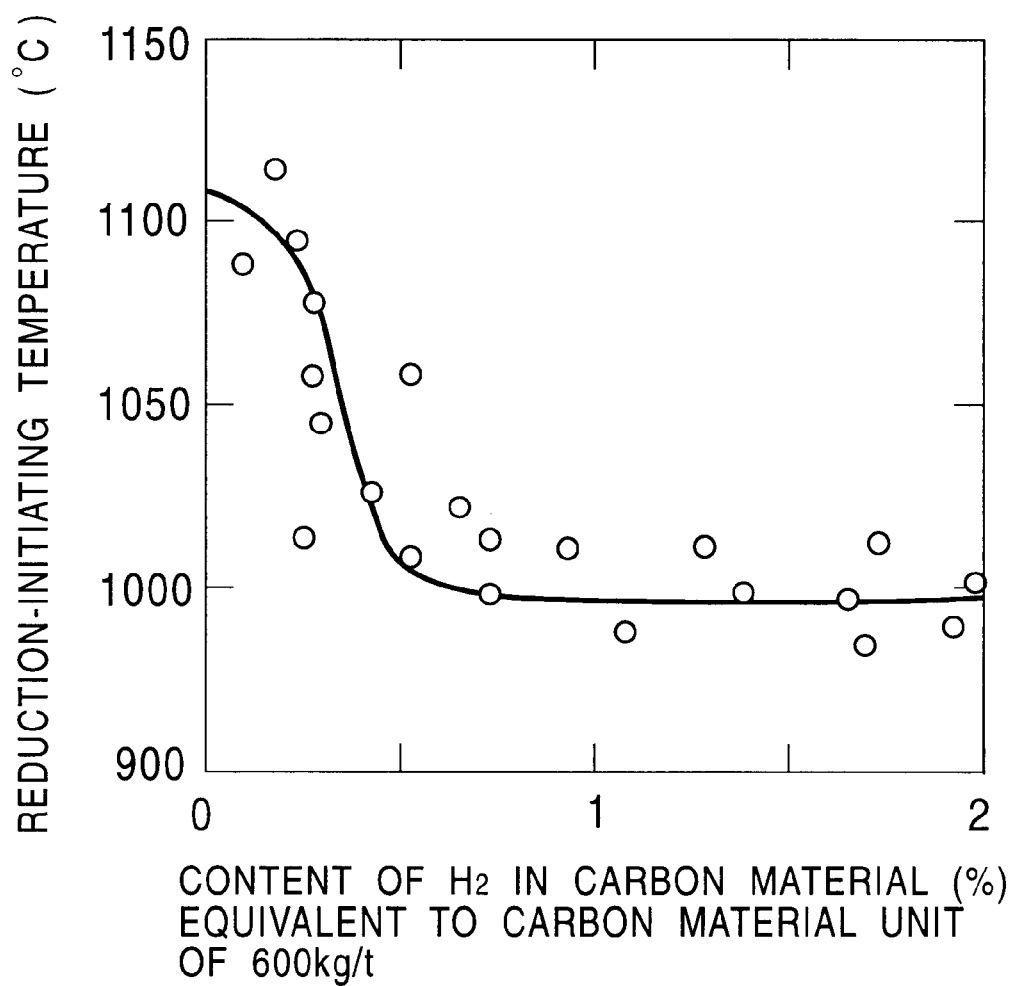
FIG. 3 graphically represents the relationship between the content of $H_2$ in a carbon material and the temperature at which to initiate reduction.

As is evident from FIG. 3, increased content of hydrogen in a carbon material contributes greatly to lowered reduction-initiating temperature at which a practically applicable rate of reduction is attainable. A drop in reduction-initiating temperature, say about 100° C., can be expected to be gained with an amount of about 0.5% by weight of hydrogen. Hence, the difference between the reaction temperature (reduction-initiating temperature) and the furnace temperature can be increased from a conventionally known level of 200° C. to as high as 300° C. so that both the rate of reaction and the rate of heat transfer are raised, respectively, to 1.5 times on the average.

Those beneficial effects are thought to accrue from two aspects set forth below.

Firstly, hydrogen itself leads to an improved rate of reaction in the formulae (3) and (4), particularly in the formula (4).

Next, the diffusion rates of $H_2$ and $H_2O$ are as high as 3.7 times and 1.6 times, respectively, as compared to those of CO and $CO_2$, so that the concentration of $H_2O$ on the surface of the carbon material becomes greater with a higher rate of reaction in the formula (4).

In the layer of a powdered mixture of an oxide powder and a solid reducing material, a gas shift according to the formula (5) below occurs in addition to the reactions of the formulae (1) to (4). The presence of hydrogen in a small amount, therefore, produces an improved rate of reaction as a whole.

$$H_2O + CO \rightarrow H_2 + CO_2 \tag{5}$$

The rate of reaction is improved in the presence of hydrogen as mentioned above. However, since the resultant effect becomes saturated at a concentration of hydrogen of more than 0.5% by weight in a carbon material, as shown in FIG. 3 above, the concentration of hydrogen in a carbon material should desirably be set to be not less than 0.5% by weight.

With regard to those methods used to stack feed stock, we have done extensive research in light of the results obtained from the above fundamental experiments. As a consequence, we have now found a noticeably effective stacking method. That is, as viewed in FIG. 4 wherein a stacking method of feed stock suited for the present invention is explained, a solid fine reducing material 2 containing hydrogen is firstly placed in a given thickness on a refractory movable hearth furnace, and a powdered mixture 1 of an oxide powder and a solid fine reducing material is then stacked in a layered posture on the first-laid reducing material. Reduction is then caused to proceed by means of radiant heat transfer applied from above. In the reduction operation of the feed stock thus stacked in layered arrangement, heat-up proceeds in a relatively short length of time up to a temperature at which an endothermic reaction initiates, and upon initiation of such reaction, the heat-up temporarily stops. A H atom contained in the reducing material is in most cases held in covalently bonded relation to a C atom, and an elimination reaction between the two atoms occurs at a temperature of 800° C. to 900° C. In the case where a hydrogen-containing reducing material is stacked beneath a powdered mixture of an oxide powder and a solid reducing material, the temperature of a lower layer reaches 800° C. to 900° C. at the time the temperature of an upper layer elevates at 1000° C. to 1100° C., whereupon the elimination reaction starts. Hydrogen generating in a lower layer moves toward the upper layer with eventual improvement in reaction rate in line with the reactions of the formulae (3) and (4).

As contrasted, according to a method in which a reducing material containing hydrogen is simply mixed with an oxide, the hydrogen becomes generated at the beginning of the heat-up stage. Because most of the hydrogen has already been discharged outside the mixture when the heat-up arrives at the temperature to initiate reduction, no advantage can be expected of gaining promoted reduction. Thus, as means for enhancing the rate of reaction with use of a hydrogen-containing reducing material, a specific method of the operation of a movable hearth furnace is conspicuously effective in reducing an oxide. In this specific method, when a layer composed of an oxide powder and a solid fine reducing material is stacked on a horizontally movable hearth, a layer of a solid fine reducing material containing hydrogen is placed as a lower layer on the hearth, and a powdered mixture of a fine iron ore and a solid fine reducing material, or a powdered mixture of a fine iron ore, additives and a solid fine reducing material is then superposed on the lower layer. Desirably, the reducing material as the lower layer contains hydrogen in an amount of not less than 0.5% by weight.

Here, the additives are a fluxing agent such as limestone, fluorite, serpentine and dolomite.

EXAMPLES

Figure 1B:
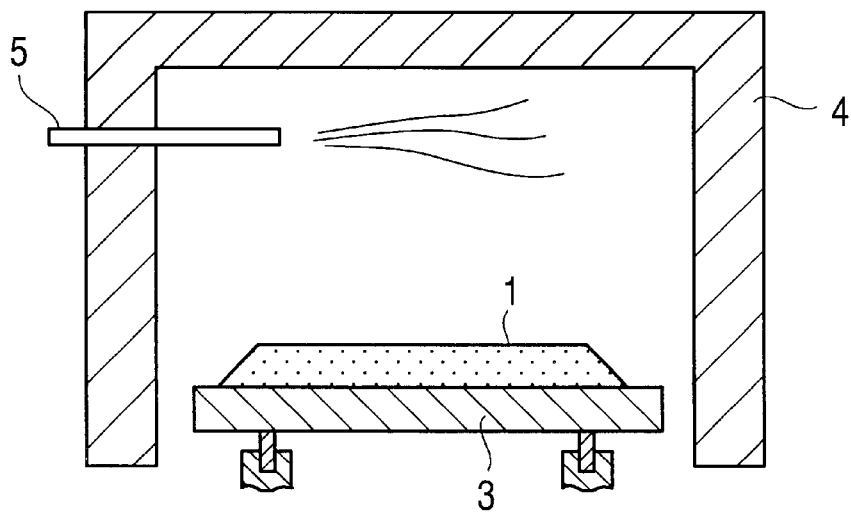
Figure 4:
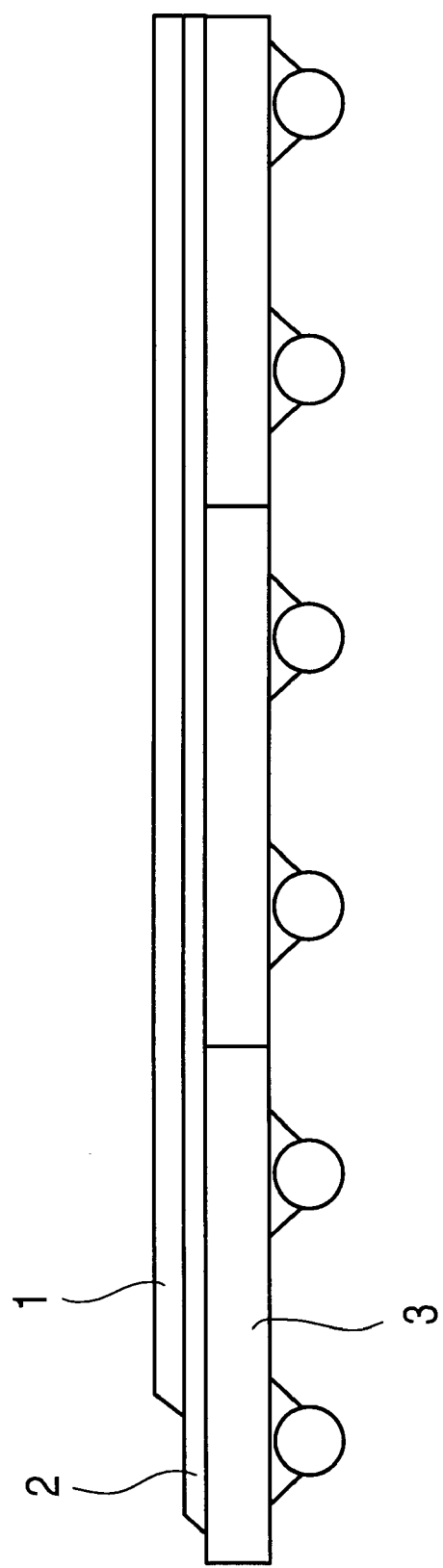
FIG. 4 is a view explanatory of the manner in which feed stocks are stacked in layered arrangement by the present invention.

By the use of a rotary hearth furnace shown in FIG. 1 above and constructed with a rotary hearth 2.2 m in diameter, a burner located upstream of the hearth and a furnace body disposed to wholly cover the associated parts, the following experimental operation was performed. The movable hearth 3 of this roraty hearth furnace was lined on its outer surface with a refractory material of an alumina type. A cooling unit was placed before discharging the products so as to cool the products, and the products were discharged using a screw type discharge unit 7. A fine iron ore and a solid fine reducing material were arranged at a supply port as seen in FIG. 4, such that a layer 2 of a solid fine reducing material and a layer 1 of a mixture of a fine iron ore and a solid fine reducing material are stacked in two-layered formation, and subsequent reduction is effected in the furnace. Here, both the fine iron ore and the solid fine reducing material were screened, prior to reduction, to pass through a screen opening of less than 3 mm. The furnace temperature in the reduction region was maintained at 1300° C. by means of controlled combustion of the burner.

In contrast, Acceptable Examples 1 to 3 using coal as a lower layer and falling within the scope of the present invention can exhibit a metallizing ratio of more than 92% with a reduction time of 18 minutes to 16 minutes. Moreover, an increased amount of the carbon material in the lower layer is capable, though slightly, of giving shortened reduction time. Mild char needs no quantity of heat as in the decomposition of coal, and hence, hydrogen has proved to exert more noticeable effects.

Figure 5:
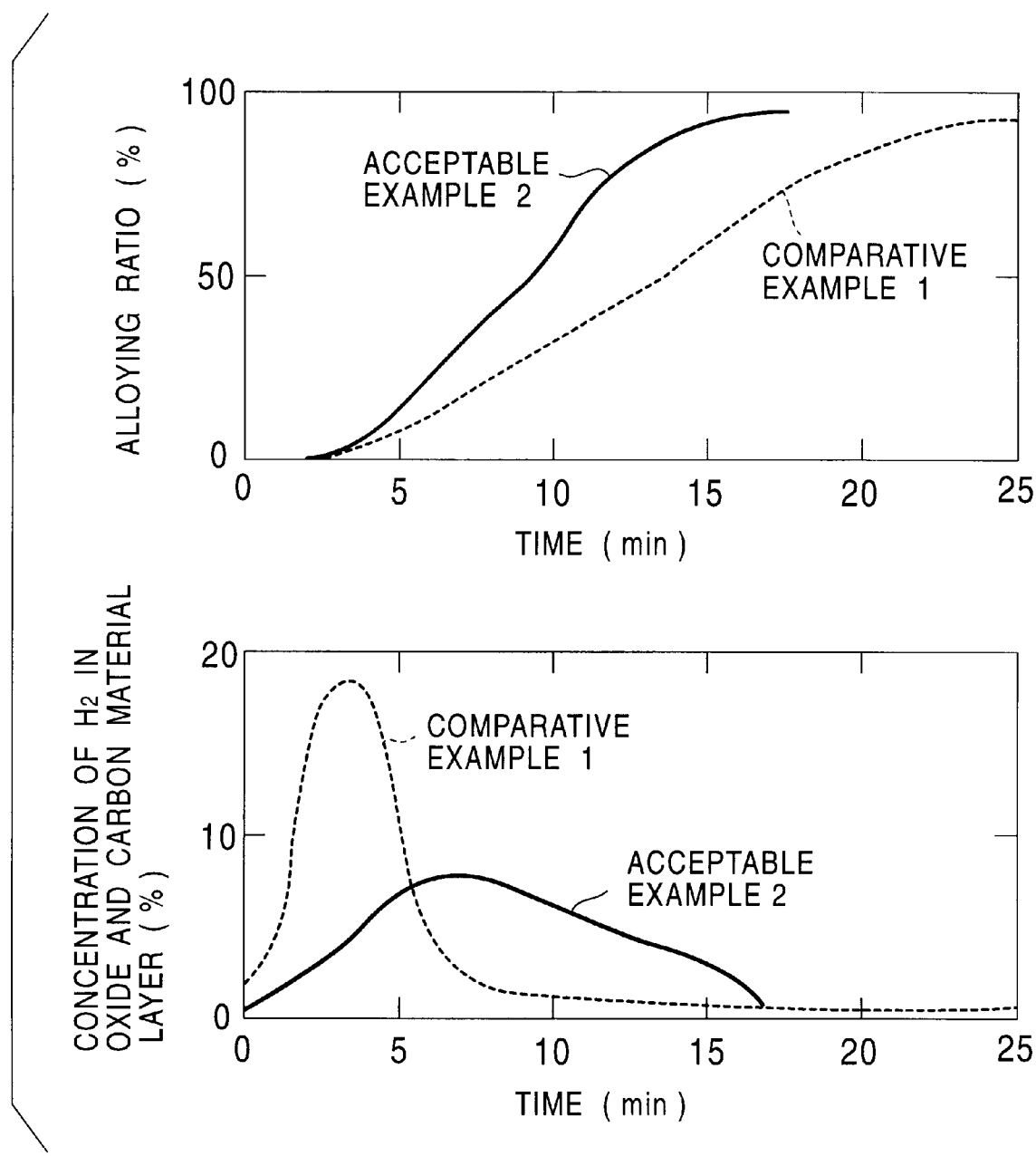
FIG. 5 are graphs showing the relationship between the metallizing ratio and the lapse of time as regards acceptable and comparative examples, and also the relationship between the concentration of hydrogen in a layer of a mixture of an oxide and a carbon material, and the lapse of time in acceptable and comparative examples.

As regards two examples using typical operation conditions, FIG. 5 represents graphs showing the relationship between the metallizing ratio and the lapse of time, and the relationship between the concentration of hydrogen gas in a mixed layer of an oxide and a carbon material and the lapse of time. In Comparative Example 1, hydrogen starts discharging at the very beginning of the reaction and becomes completely discharged even with a maximum hydrogen concentration up to 18% before a reduction reaction initiates. A reduction time of about 25 minutes is thus needed in achieving a metallizing ratio of higher than 92%. On the other hand, Acceptable Example 2 reveals a period of time for hydrogen discharging in the shape of a rearwardly gentle curve. This means that a metallizing ratio of not less than 92% is attainable with a reduction time of about 17 minutes for the reasons of promoted reduction with hydrogen, lowered temperature at which to initiate reduction, substantially increased amount of heat transfer and the like.

TABLE 1

| Experiment No. | Kind of carbon material | Amount of carbon material (mixed with the oxide) (kg/t) | Amount of carbon material (Lower-layered carbon material) (kg/t) | Method for stack of feed stock | Reduction time (min) | Metallizing ratio (%) | Remarks |
|---|---|---|---|---|---|---|---|
| 1 | Coal (H = 4%) | 600 | 100 | Lower layering carbon material | 18 | 92.5 | Acceptable Example 1 |
| 2 | Coal (H = 4%) | 600 | 200 | Lower layering carbon material | 17 | 92.6 | Acceptable Example 2 |
| 3 | Coal (H = 4%) | 600 | 300 | Lower layering carbon material | 16 | 92.8 | Acceptable Example 3 |
| 4 | Mild char (H = 2%) | 550 | 200 | Lower layering carbon material | 16 | 92.7 | Acceptable Example 4 |
| 5 | Coal (H = 4%) | 600 | 0 | Uniformly mixed | 25 | 92.1 | Comparative Example 1 |
| 6 | Coke (H = 0.3%) | 500 | 300 | Lower layering carbon material | 28 | 92.3 | Comparative Example 2 |

In Table 1, the results related to reduction times, and metallizing ratios were tabulated, which were obtained when the reduction operation was carried out with varying kinds and amounts of the fine reducing materials, i.e., carbon materials, and with varying stacks of feed stock. As shown in Table 1, use was made of three kinds of carbon materials of different hydrogen contents, such as coal (hydrogen 4%), mild char (hydrogen 2%) and coke (hydrogen 0.3%), and the carbon material was mixed in an amount of 500 to 600 kg/t with an oxide, which amount was required for reduction to proceed. The reduction operation was conducted with varied amounts of the carbon material for use as the lower layer.

As is clear from Table 1, Comparative Example 1 in which coal was uniformly mixed and Comparative Example 2 in which hydrogen-free coke was employed as a lower layer were found to be beyond 92% in reduction ratio with 25 minutes and 28 minutes in reduction time, respectively.

INDUSTRIAL APPLICABILITY

According to the present invention, a layer composed of a mixture of a fine iron-ore and a reducing material and a layer of a hydrogen-containing reducing material placed therebeneath are stacked on a movable hearth, whereby the fine iron ore is reduced in a movable hearth furnace. The invention leads to a sharp reduction of reduction time, thus contributing greatly to improved productivity or reduced equipment cost of the reduction furnace.

What is claimed is:

1. A method of reducing iron ore on a movable hearth furnace, comprising the steps of:

supplying a lower layer of a solid fine reducing material on said hearth, having hydrogen content of 0.5% by weight or more, supplying a mixed layer dominantly comprising a fine iron ore and a solid fine reducing material on said movable hearth;

arranging said powder and said fine reducing material superposed on said lower fine reducing material layer; and subjecting said oxide powder to reduction by radiant heat transfer transmitted from an upper furnace portion within said furnace, wherein a powder mixture comprising a fine iron ore and a solid fine reducing material is stacked in a layered arrangement on said layer of a solid fine reducing material having a hydrogen content of 0.5% by weight or more.

2. The method according to claim 1, wherein said movable hearth is a rotary hearth.

3. The method defined in claim 1 wherein said powder mixture comprises a fine iron ore, fine additives and a solid fine reducing material.

4. The method defined in claim 3, wherein said fine additives are selected from the group consisting of limestone, fluorite, serpentine and dolomite.

5. The method defined in claim 3, wherein said fine iron ore and said solid fine reducing material are screened to pass through a screen opening of less than 3 mm prior to reduction.

* * * * *